United States Patent [19]

Onishi et al.

[11] Patent Number: 5,434,863
[45] Date of Patent: Jul. 18, 1995

[54] INTERNETWORKING APPARATUS FOR CONNECTING PLURAL NETWORK SYSTEMS AND COMMUNICATION NETWORK SYSTEM COMPOSED OF PLURAL NETWORK SYSTEMS MUTUALLY CONNECTED

[75] Inventors: Katsuyoshi Onishi, Yokohama; Naoya Ikeda, Ebina; Osamu Takada, Sagamihara; Toshiaki Koyama, Zama; Hiromichi Enomoto, Hadano, all of Japan

[73] Assignee: Hitachi, Ltd., Tokyo, Japan

[21] Appl. No.: 935,919

[22] Filed: Aug. 27, 1992

[30] Foreign Application Priority Data

Aug. 30, 1991 [JP] Japan .................................. 3-219610

[51] Int. Cl.⁶ ............................................. H04L 12/66
[52] U.S. Cl. ................................. 370/85.13; 370/85.9
[58] Field of Search ................... 370/94.1, 94.2, 85.13, 370/85.9, 85.1, 85.11, 60

[56] References Cited

U.S. PATENT DOCUMENTS

| | | | |
|---|---|---|---|
| 4,872,162 | 10/1989 | Tanaka et al. | 370/94.1 |
| 4,972,409 | 11/1990 | Backes | 370/85.13 |
| 5,010,546 | 4/1991 | Kato | 370/94.1 |
| 5,027,350 | 6/1991 | Marshall | 370/85.13 |
| 5,088,090 | 2/1992 | Yacoby | 370/85.13 |
| 5,177,737 | 1/1993 | Daudelin et al. | 370/67 |

Primary Examiner—Douglas W. Olms
Assistant Examiner—Ajit Patel
Attorney, Agent, or Firm—Antonelli, Terry, Stout & Kraus

[57] ABSTRACT

An internetworking apparatus which handles a scale of a network flexibly without degrading high speed operation. A router manager and a plurality of routing accelerator modules for performing routing are connected to one another through a high speed bus, and a plurality of communication ports are connected to the respective routing accelerators independently of one another. The plurality of routing accelerators can perform the routing for reception data packet at high speed. If more routing accelerators are provided, the disposal to the networks having a small scale to a large scale can be readily realized.

16 Claims, 15 Drawing Sheets

[CASE 1] DISCARD

[CASE 2] ROUTING BETWEEN LCs UNDER RA

[CASE 3] ROUTING BETWEEN RAs

[CASE 4] PACKET ADDRESSED TO ROUTER

F I G. 5
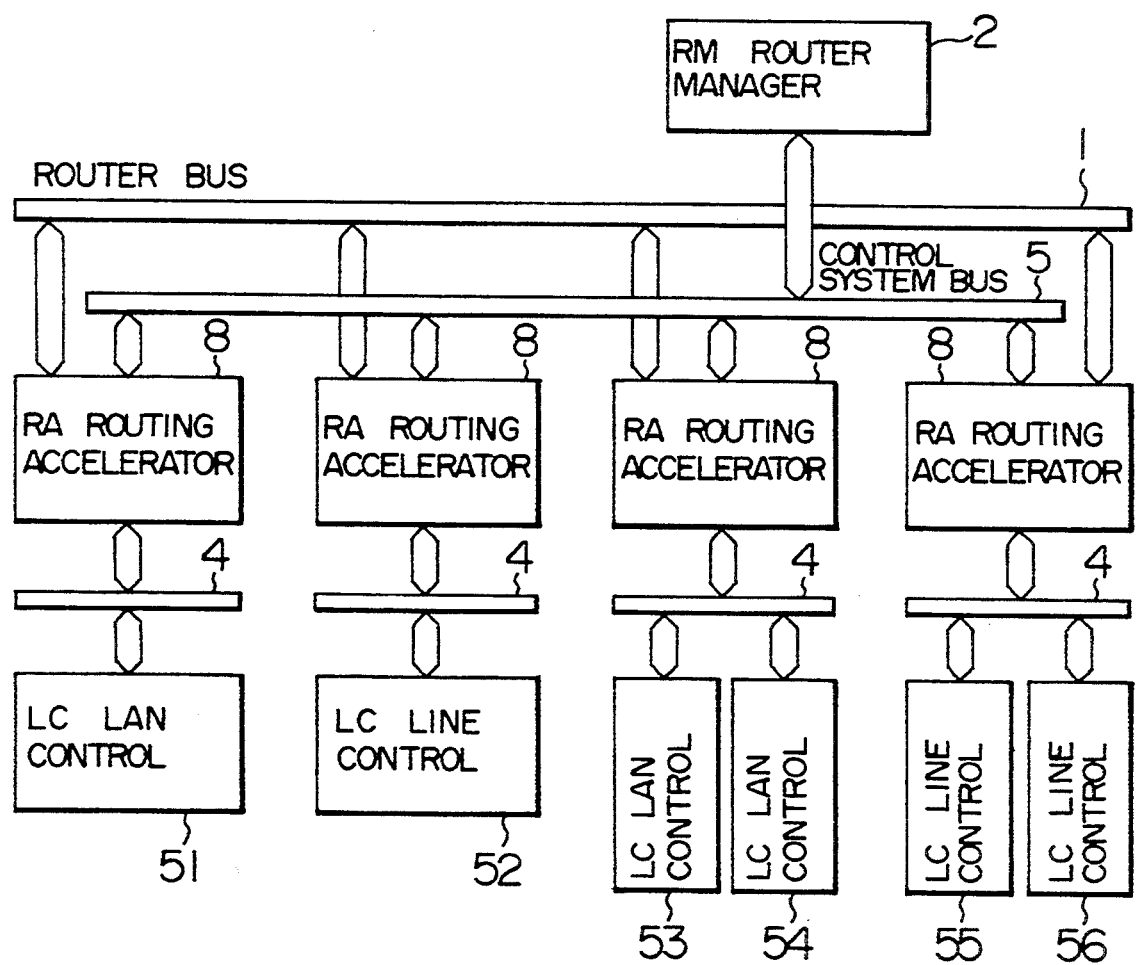

F I G. 9
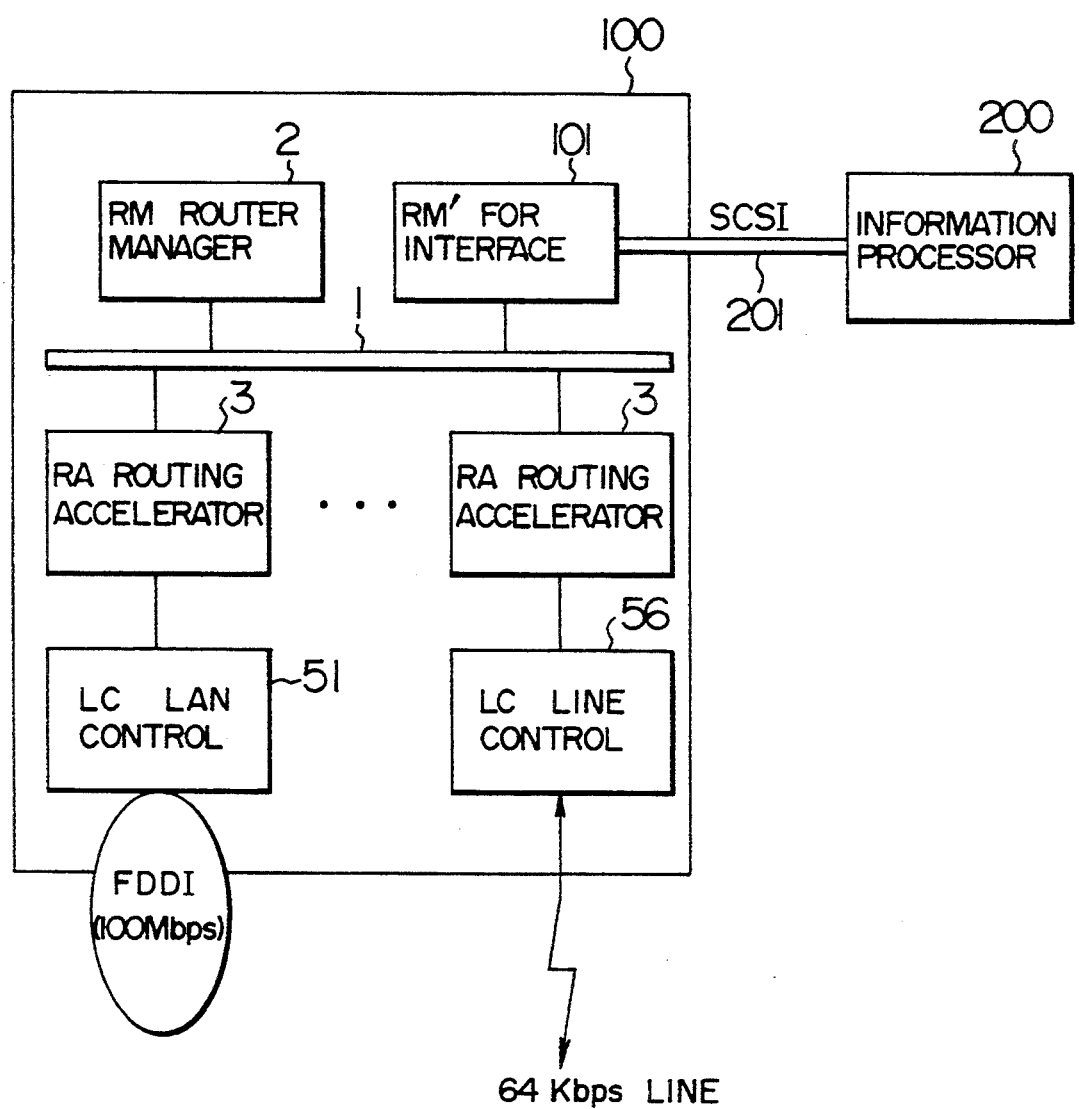

F I G. 13
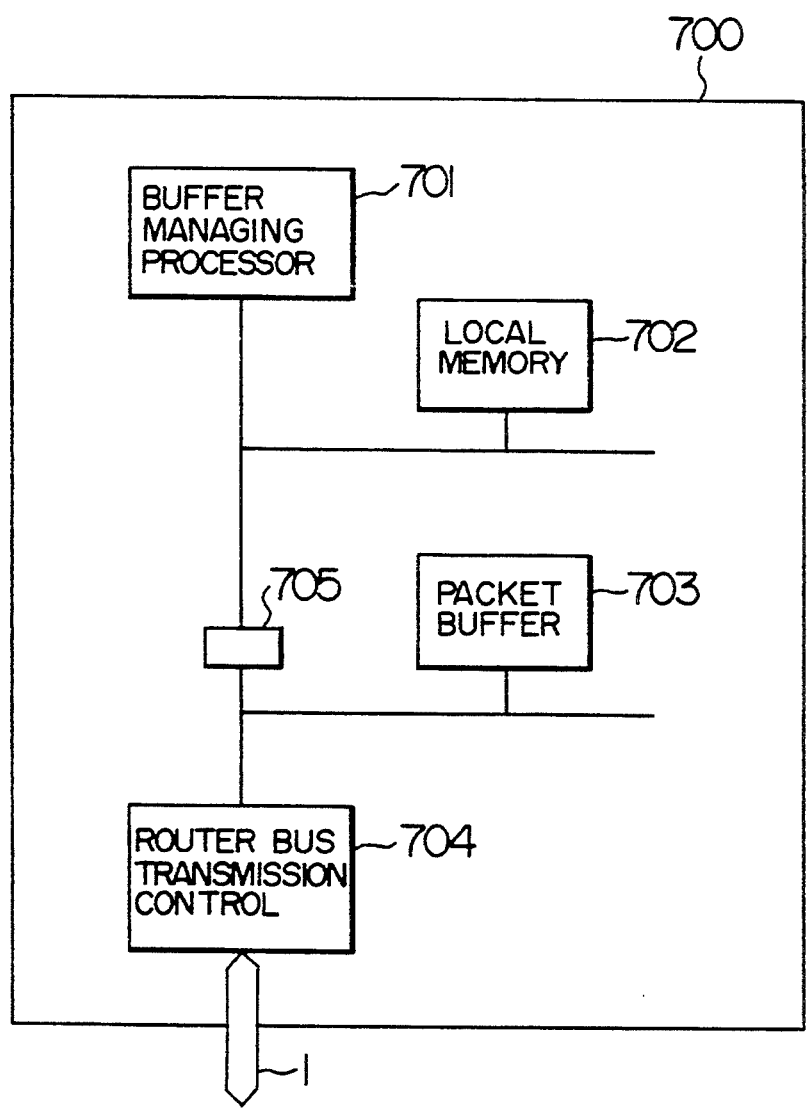

INTERNETWORKING APPARATUS FOR CONNECTING PLURAL NETWORK SYSTEMS AND COMMUNICATION NETWORK SYSTEM COMPOSED OF PLURAL NETWORK SYSTEMS MUTUALLY CONNECTED

BACKGROUND OF THE INVENTION

The present invention relates to a communication network system for connecting a plurality of networks, and more particularly to an internetworking apparatus referred to as a router which connects a plurality of networks at network layer levels, and an internetworking apparatus referred to as a router which has a router function of connecting a plurality of networks at network layer levels as well as a bridging function of connecting a plurality of networks at data link layer levels.

As for an apparatus for connecting a plurality of networks, there are known a bridge which performs cross connection in a data link layer (especially, a media access sub-layer) of a network system hierarchy, and a router which performs the cross connection in a network layer as a layer having a rank higher than that of the bridge, or the like.

The bridge manages an MAC (Media Access Control) address, and judges whether or not a reception frame from a certain network (being also referred to as "reception packet data") is forwarded to other networks on the basis of the contents of the destination MAC address in the reception frame and a filtering address table as forwarding control information.

Moreover, in the router as well, on the basis of the internetworking address in the reception frame and an address resolution table in the router, a predetermined route or an optimal route is selected to perform the forwarding processing of the reception frame.

Incidentally, there are some kinds of protocol used in the network layer. As a typical example, there is well known an IP (Internet Protocol). In this IP protocol, an IP address is used as the internetworking address. Then, the MAC address of the adjacent route corresponding to the destination IP address is written in the address resolution table.

Further, in recent years, an apparatus which has the router function as well as the bridging function has been developed to be used for the connection between the different kind networks. This apparatus is called a router. This router performs the routing with respect to the frame data amenable to the protocol which is supported by the apparatus of interest, i.e., able to be subjected to the routing, out of the various protocols used in the network layer, thereby to perform the across connection in the network layer. On the other hand, this router performs the forwarding processing of the frame data in the media access sub-layer, i.e., the bridging processing with respect to the frame data amenable to the protocol which is not supported by the apparatus of interest, i.e., cannot be subjected to the routing.

As described above, the network apparatus, such as the bridging apparatus, the router and the router, is designed in such a way as to have at least two or more communication ports, and the processor for performing the above forwarding processing called the routing or bridging.

As the prior art example having such a configuration, the general operation of the router will hereinbelow be further described in detail. The packet data which has been received from a certain communication port is stored in a buffer memory, and then the packet data is subjected to the routing processing by the processor, whereby the router obtains a network to which the data will be transmitted. Then, by sending the packet data from another communication port corresponding to the destination network, the router performs the routing of the packet data.

FIG. 2 is a diagram showing schematically a plurality of networks which are connected to one another through routers. In the figure, eight networks are connected to one another through five routers. Paying attention to a router A out of those routers, networks A, B, C and D are connected to ports a, b, c and d of the router A, respectively. Now, if the data is intended to be sent from a terminal A1 in the network A to a terminal G2 in a network G connected to a router E, the packet data addressed from the terminal A1 to the terminal G2 is transmitted with the physical destination address as an address for the port a of the router A. After receiving this packet data, the router A forwards the packet data to one of the networks B, C and D, i.e., performing the routing processing. In order to perform this routing processing, the router A needs to know previously which of the networks B, C and D must the packet data addressed to the terminal G2 be forwarded to. In this example, on the assumption that the packet data must be transmitted to the network B, i.e., the router B, the packet data is transmitted with the physical destination address as an address for the port e of the router B. The same routing is also performed in the routers B and E, and thus finally, that packet data reaches the terminal G2.

As for the prior art for performing such a routing processing at high speed, there is given the technology disclosed in JP-A-62-181551. According to this technology, a buffer memory for storing the packet data received from one port, and a buffer memory for storing the packet data received from the other port are provided separately and independently of each other, and the management of the buffer memorys is performed with the hardware.

Moreover, as for the prior art for performing the packet transmission between ports at high speed, there is given the technology disclosed in an article "OUTLINE OF TCP/IP AND INTERNET" p.17 issued on Dec. 19, 1990 by Net One Systems Co. Ltd. According to this technology, a high speed bus is provided for the high speed port transmission.

In the above prior art technology, the following points will become problems.

Although the transmission of the packet data can be performed at high speed in the router according to the prior art, the means for performing the routing is provided only in one place. Therefore, the routing provides a limit, and thus there is a limit to the number of ports capable of being supported and the communication traffic. Accordingly, it is difficult to smoothly extend the organization of the port menue and the like of the router from a small scale to a large scale and improve the performance in correspondence to the port traffic or the number of ports.

Further, in recent years, there has been increased the necessity of the dynamic routing to recognize the configuration and the like of the network during the operation of the network to dynamically produce, add, change and delete the forward information for the routing processing (in the above prior art example, the information for the forwarding which is assumed to be previously known by each router). That is, there is required the processing of a routing protocol (e.g., RIP (Routing Information Protocol), OSPF (open Shortest Path First) and the like in the TCP/IP protocol group) for exchanging the information about the network between the routers. Further, the means for performing the routing in the prior art must also perform the processing of a network management protocol (e.g., SNMP (Simple Network Management Protocol) and the like in the TCP/IP protocol group) for communicating the management information such as performance information of the router itself to the management master station on the network. Therefore, the original forwarding performance cannot show sufficiently. Accordingly, it is difficult for the prior art router to cope with an FDDI (Fiber Distributed Data Interface) as a high speed LAN (Local Area Network) of 100 Mbps (Mega bit per second) which has been developed in recent years, and a high speed line of 155 Mbps such as a broad-band ISDN (hereinafter, referred to as B-ISDN for short, when applicable) which is expected to come into wide use in the future and an ATM (Asyncronized Transfer Mode) as one form thereof.

SUMMARY OF THE INVENTION

It is therefore an object of the present invention to provide an internetworking apparatus which is capable of performing the routing and the packet transmission and performing readily the extension of the scale and the improvement in the performance.

It is another object of the present invention to provide an internetworking apparatus in which the data transmission during the bridging and the routing when provided with a facility as the above-mentioned brouter is taken into consideration.

It is still another object of the present invention to provide a router which is capable of being connected to the existing apparatus in order to increase the kinds of protocol which is capable of being processed.

In order to attain the above objects, an internetworking apparatus according to the present invention includes one or more routing accelerators for assisting a main processor to perform the routing.

Thus, the routing accelerator subjects the reception packet data to the routing, and transmits the data to other routing accelerators if necessary. That is, the routing accelerator discriminates the kind of the data frame. In the case where the data frame is recognized to be amenable to the protocol which cannot be subjected to the routing, the data is transmitted to other routing accelerators in order to perform the bridging.

Further, in order to attain the above objects, the internetworking apparatus according to the present invention includes a first connection unit for connecting between the routing accelerators. The main processor as a router manager for managing the whole internetworking apparatus is connected to the first connection unit. The network apparatus includes a second connection unit for connecting between a plurality of communication ports and the routing accelerator, which send or receive the data to or from the network, independently of other routing accelerators.

Thus, after producing/changing a routing table for the routing, the router manager distributes the routing table to all of the routing accelerators. Each routing accelerator subjects the reception packet data from the communication ports connected through the second connection unit to the routing on referring to the routing table distributed thereto, and transmits the data to the other routing accelerators using the first connection unit if necessary. That is, the routing accelerator discriminates the kind of the data frame. Then, in the case where the data frame is recognized to be amenable to the protocol which can not be subjected to the routing, the data is transmitted to other routing accelerators in order to perform the bridging. The routing accelerator which has received the data thus transmitted thereto transmits the packet data to the network using the communication ports connected through the second connection unit. Therefore, the internetworking apparatus of the present invention can perform the routing/packet forwarding processing dispersedly with plural sets of routing accelerator and communication port section. Incidentally, the management frame addressed to the main processor by which the main processor is to produce/change the routing table or communicate with the network management master is transmitted from the routing accelerator to the main processor using the first connection unit. Moreover, in the case where the routing accelerator receives the reception data from the communication ports connected through the second connection unit, and then discriminates the kind of the data frame to recognize it to be amenable to the protocol which cannot be subjected to the routing, the data can be also transmitted for the main processor. The main processor performs the routing if the protocol can be processed, and retransmits the data frame to a suitable destination routing accelerator, thereby to perform the routing of the packet data amenable to the special protocol.

Further, in order to attain the above objects, the internetworking apparatus of the present invention includes a third connection unit for connecting between the main processor and the routing accelerators independently of the first connection unit.

As a result, there are performed through the third connection unit the operation of distributing the routing table to all of the routing accelerators through the main processor, and the operation of transmitting the management frame addressed to the main processor from the routing accelerator to the main processor.

Further, in order to attain the above objects, the internetworking apparatus of the present invention includes an auxiliary processor in addition to the main processor and the routing accelerators. Then, the auxiliary processor and the routing accelerators are connected to one another through the first connection unit or the third connection unit. As for the functions of the auxiliary processor, for the purpose of extending the function, there are provided the multiple transmission function for the bridging, the interface function to other apparatuses, and the function of processing the routing protocol which cannot be processed by the main processor.

As a result, the auxiliary processor assists the processing by the main processor, and the bridging function of the destination routing accelerator in correspondence to the multiple transmission function for the bridging, the interface function to other apparatuses, the function of processing the routing protocol which cannot be processed by the main processor, and the like, in accordance with the facilities mounted to the auxiliary processor. For example, in the case where the auxiliary processor assists the multiple transmission function for the bridging, when the routing accelerator receives the data frame amenable to the protocol which cannot be subjected to the routing, the routing accelerator transmits the frame data to be bridged, to the auxiliary processor. After the auxiliary processor stores temporarily the frame data thus transmitted thereto in the buffer memory, the auxiliary processor transmits the data to all of the other routing accelerators through the first connection unit.

Further, in order to attain the above objects, the internetworking apparatus of the present invention includes a buffer as a router circuit for storing the data in the routing accelerator, a filtering assisting unit for performing the filtering under predetermined conditions in parallel to the storage operation, and a routing assisting unit for extracting the necessary information from the reception packet data to retrieve a routing table.

As a result, with the routing accelerator, the filtering assisting unit performs the filtering under the predetermined conditions in parallel to the operation of storing the reception packet data in the buffer to discard the packet data which does not require the forwarding. With respect to the reception packet data which requires the forwarding, the processor and the routing assisting unit discriminate the destination thereof to transmit the packet to the routing accelerator which is to be addressed.

Therefore, according to the present invention, the following effects can be obtained.

Since the router manager for performing the non-routing such as the facility of managing the network, and the routing accelerators for performing the routing are provided independently of one another, the routing accelerator can perform the routing devotedly to provide the high speed operation.

Since a plurality of packet data can be subjected to the routing simultaneously by a plurality of routing accelerators, the routing as the whole apparatus can be performed at high speed. Moreover, since more routing accelerators can be provided, the configuration of the router can be readily extended in correspondence to the necessary number of networks and the communication traffic.

Further, if the auxiliary processor of the present invention is used, it is also possible to perform the bridging at high speed and extend the function by connecting the present apparatus to the external system.

Therefore, according to the present invention, it is possible to realize the internetworking apparatus which has the scalability and performs the high speed routing and bridging.

BRIEF DESCRIPTION OF THE DRAWINGS

The present invention will be more apparent from the following detailed description, when taken in conjunction with the accompanying drawings, in which;

FIG. 5 is a block diagram showing a configuration of an internetworking apparatus of one embodiment of the present invention in which a packet exclusive bus and a control data bus are separated from each other;

FIG. 9 is a block diagram showing a configuration of the internetworking apparatus in which one embodiment of the present invention and an information processor are connected to each other through an external bus;

FIG. 13 is a block diagram showing a configuration of the bridging assisting section according to one embodiment of the present invention;

DESCRIPTION OF THE PREFERRED EMBODIMENTS

Preferred embodiments of the present invention will hereinafter be described in detail with reference to the accompanying drawings. Incidentally, an internetworking apparatus of the present invention has a facility of the above-mentioned brouter. However, in the following description, the routing as the original object will be mainly explained. Therefore, the apparatus will be referred to as a router.

1. Configuration of Router

Figure 1:
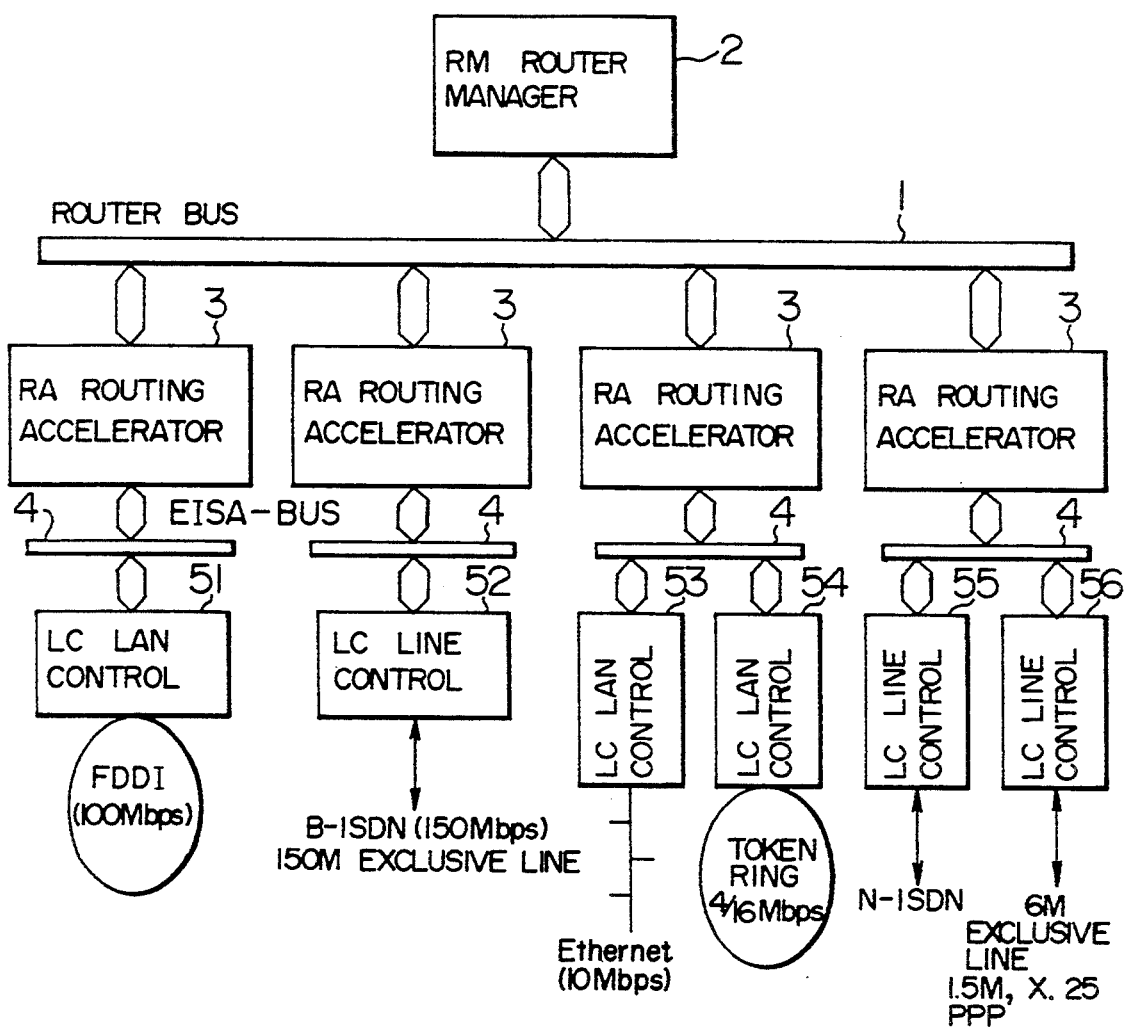
FIG. 1 is a block diagram showing a configuration of an internetworking system according to one embodiment of the present invention.
Figure 2:
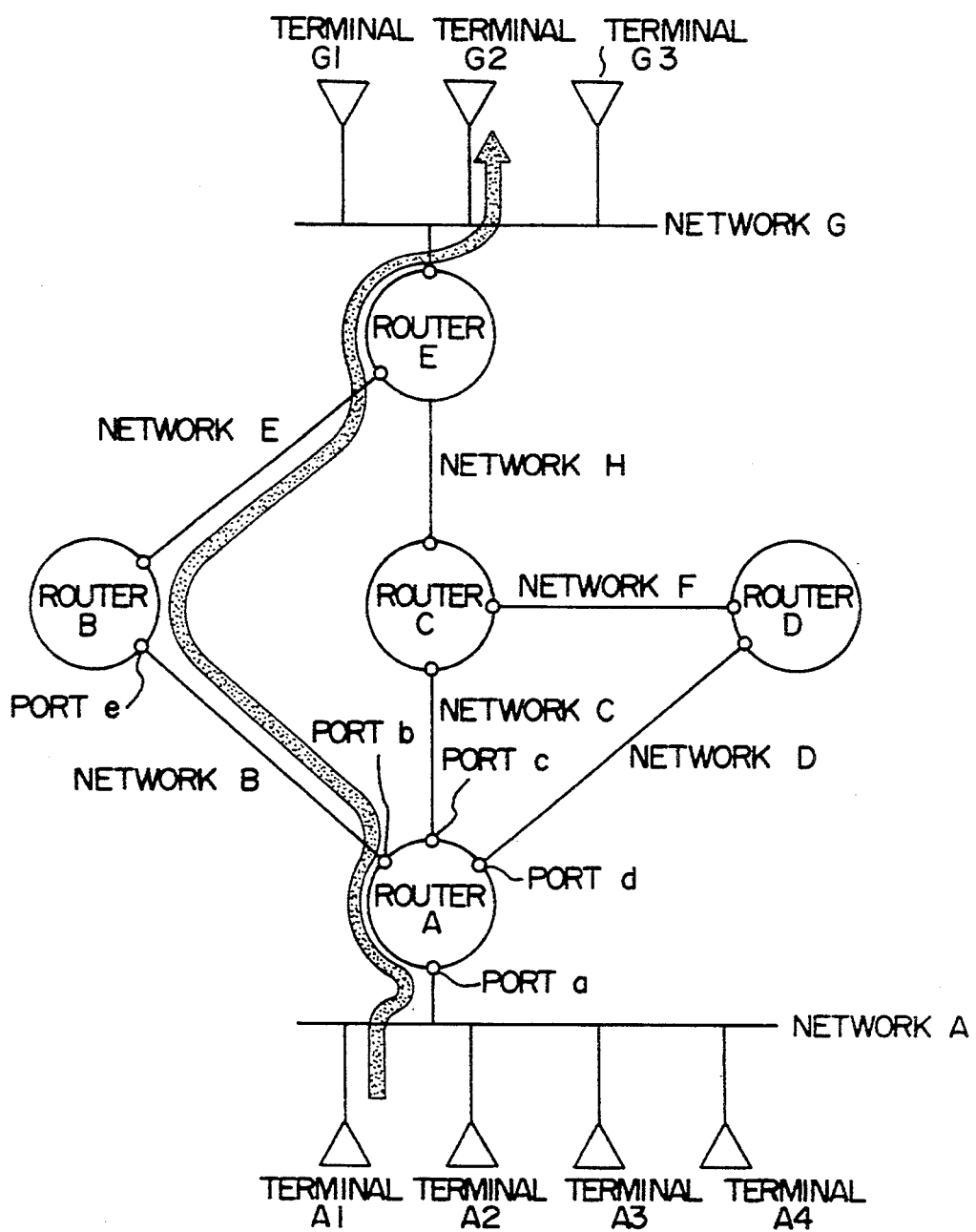
FIG. 2 is a diagram showing schematically a network system employing routers.
Figure 3A:
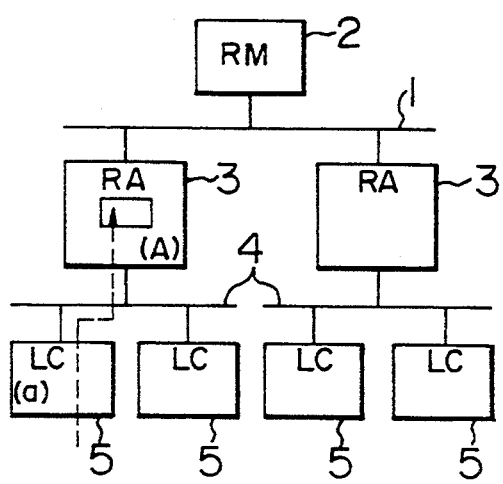
FIGS. 3A to 3D are respectively block diagram showing respective cases in the routing when one embodiment of the present invention is applied.
Figure 3B:
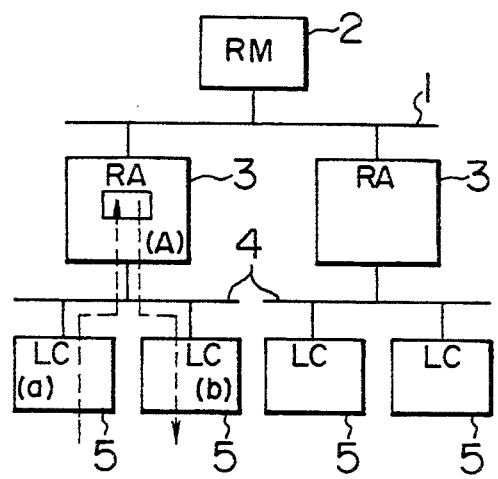
Figure 3C:
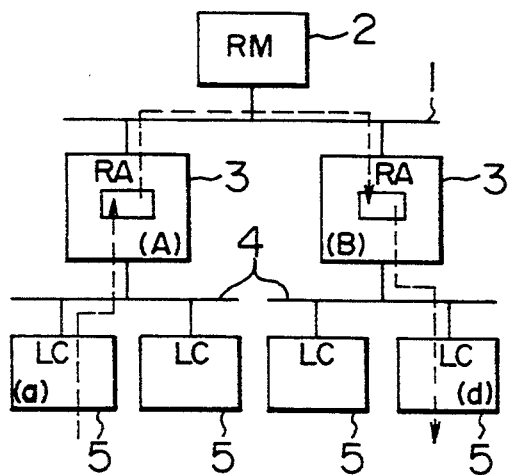
Figure 3D:
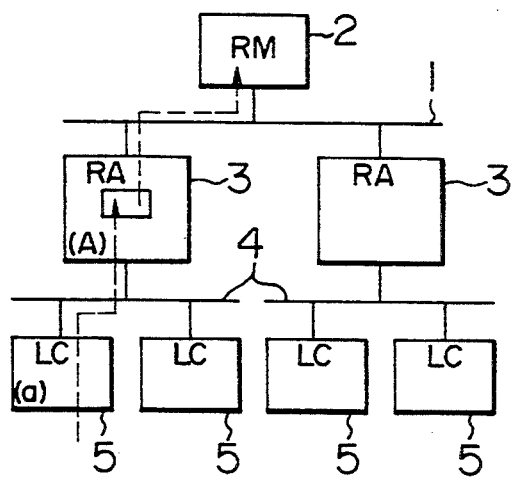

First, the description will be given to the whole configuration of a router of one embodiment of the present invention on referring to FIG. 1. The router of the present embodiment has a plurality of modules for performing the routing. Thus, the provision of more modules allows the performance of the system to be readily improved. Each module has one routing accelerator, and each routing accelerator has one or more communication ports. FIG. 1 is a block diagram showing the whole configuration of the router. In FIG. 1, the reference numeral 1 designates a high speed router bus which has a throughput of 200 M Bytes/sec and acts as first connection means. To the router bus 1 is connected a router manager 2 which has a function of managing the whole system and a function of producing/distributing a routing table and acts as a main processor. Further, to the router bus 1 can be connected routing accelerators 3 of 1 to 8 modules each of which has a function of performing the routing at high speed. The router manager 2 distributes the routing table to the routing accelerators 3 each of which performs, on the basis of the routing table, the route selection of the reception packet data, i.e., the routing and transmits the packet data through the router bus 1 to the routing accelerators 3 under which the called network is connected.

Further, in the low hierarchy of the routing accelerators 3, as buses of second connection means designated by the reference numeral 4, for example, there are provided EISA buses (Extended Industry Standard Architecture Buses) of 33 M Bytes/sec 4. To the buses are connected various communication control sections 51 to 56 (hereinafter, being also referred to as "ports", when applicable). Then, only one high speed communication port 51 of FDDI of 100 Mbps class as the communication port corresponding to the throughput of the EISA bus is connected to the routing accelerator 3 with one-to-one correspondence. Similarly, only one communication poret 52 of ATM (B-ISDN) of 155 Mbps as the high speed line is also connected to the routing accelerator 3. Moreover, with respect to the communication port for the medium or low speed communication, such as a communication port 53 of Ethernet as LAN of 100 Mbps, a communication port 54 of Token Ring LAN as LAN of 4 Mbps to 16 Mbps, or a communication port 55 of N-ISDN as the line of 1.5 Mbps, since the capability of one routing accelerator 3 and the throughput of one EISA bus can correspond to a plurality of communication ports, in this case, two communication ports are connected to the EISA bus. Incidentally, the routing accelerators 3 and the communication ports 51 to 56, which are paired with each other, may be mounted on the different substrates or the same substrate.

2. Routing

The description will hereinbelow be given to the routing in the router having the above basic configuration.

First, it is assumed that the router manager 2 distributes the routing table to all of the routing accelerators 3, and thus each routing accelerator 3 has the routing information. For example, the router manager 2 sends or receives the data to or from other routers with the routing protocol such as the above RIP or OSPF, or accumulates the routing information by setting a suitable protocol previously and statically by a user.

This routing table is an aggregate of the routing information which shows the information for one routing every network address. Further, with respect to the so-called sub-networks which are obtained by partitioning the network addresses to be operated as a plurality of networks of small scale, the routing information is defined every sub-network.

Figure 14:
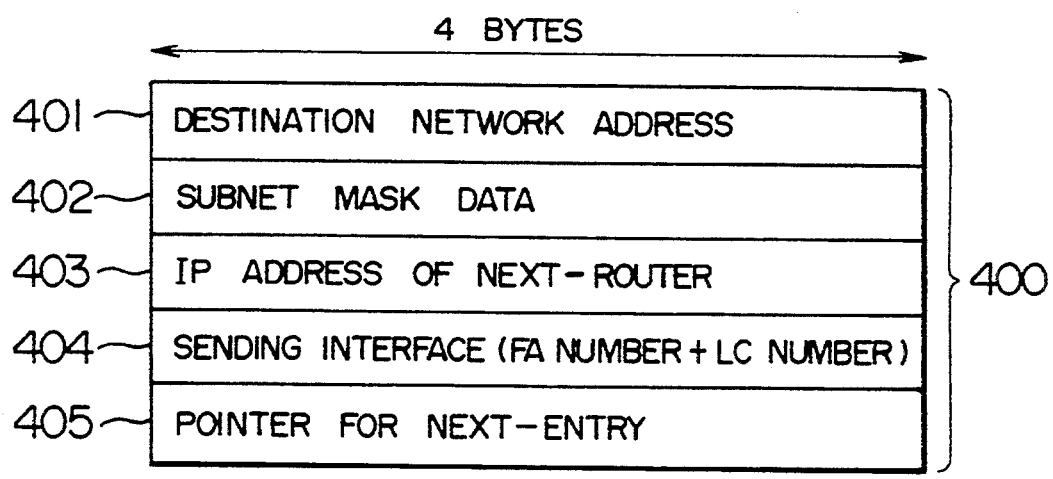
FIG. 14 is a diagram showing an structure of routing information according to one embodiment of the present invention.

FIG. 14 is a diagram showing an example of one routing information. In this example, only the IP protocol is taken, and the added information such as the classification of the network service is omitted. In FIG. 14, a routing table 400 is made up of a field 401 of an IP address for representing the destination network, subnet mask data 402 for representing subnet information of the destination network, an IP address 403 of a next-router, a sending interface 404 for forwarding the data to the next-router, and a pointer 405 for a next-entry.

The sending interface 404 is, in the present embodiment, made up of an identification number (RA number) of the called RA (Routing Accelerator) and an identification number (LC number) of the port to be sent in the called RA. Moreover, the pointer 405 for a next-entry is a necessary field in a structure aspect of the routing information in the inside of RA, but is meaningless when being distributed by the above RM (Router Manager).

Figure 15:
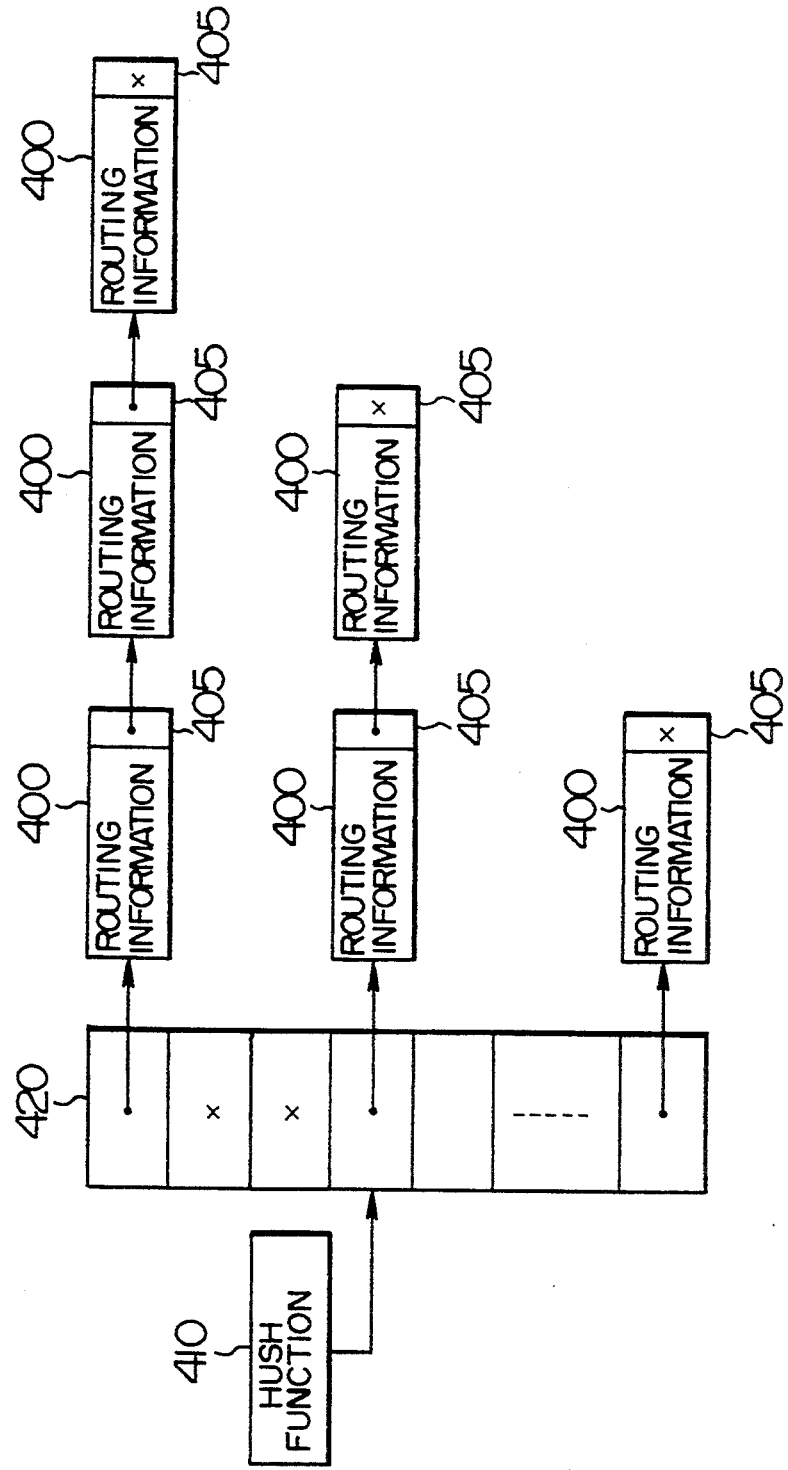
FIG. 15 is a diagram showing an organization of a routing table according to one embodiment of the present invention.

The routing table as the aggregate of the routing information 400 in RA has an organization shown in FIG. 15 to perform the high speed retrieval. A hash function 410 projects a certain amount of data on a smaller amount of data. In the present embodiment, for example, 24 bits of the network address portion out of the IP address is projected on 8 bits. Since the output of the hash function is 8 bits, the number of entries of a hash entry table 420 is 256. The pointer for the routing information 400 corresponding to the result which is obtained by hashing the network address is stored in each entry in the hash entry table 420. The amount of data is compacted by the hash. Therefore, as the result of hashing the different network address values, the resultant data becomes sometimes the same address value of 8 bits. Accordingly, as shown in FIG. 15, the routing information having the network address which will become the same result by hashing is coupled through pointers 405.

Incidentally, the procedure of retrieving the routing table corresponding to the IP address and the organization of the routing table, which have been just described above, is described in detail in an article 'Internetworking with TCP/IP VOLUME II" by Douglas E. Comer (pp. 81 to 84). The present embodiment also employs the data structure in the routing table and RA thereof which are amenable to this technique.

FIGS. 3A to 3D are respectively diagrams showing cases of the various routing in the router of the present invention including plural modules/plural ports. Incidentally, in those figures, the manager 2, the routing accelerator 3, and each of the communication ports 51 to 56 are represented by RM, RA and LC, respectively, for short.

A case 1 (FIG. 3A) shows the case of discard. The routing accelerator RA(A) stores temporarily the packet, which has been received by the communication port LC(a) provided thereunder, in the packet buffer, and then performs the filtering and the routing. Then, as the result of performing the filtering/routing, in the case where the destination of the packet is addressed to the communication port LC(a) which has received the packet, the packet of interest is discarded.

A case 2 (FIG. 3B) shows the case where the routing is performed between the ports in the routing accelerator RA(A). The routing accelerator RA(A) stores temporarily the packet, which has been received by the communication port LC(a) provided thereunder, in the packet buffer, and then performs the filtering and the routing. Then, as the result of performing the filtering/routing, in the case where the destination of the packet which has been received by the communication port LC(a) is addressed to the communication port LC(a) under the routing accelerator RA(A), the reception packet of interest is returned to be transmitted to the communication port LC(b), thus performing the forwarding. In this case, only one routing accelerator RA(A) acts as the router.

A case 3 (FIG. 3C) shows the case where the routing is performed between the routing accelerators RA(A) and RA(B) through the router bus. The routing accelerator RA(A) stores temporarily the packet, which has been received by the communication port LC(a) provided thereunder, in the packet buffer, and then performs the filtering and the routing. Then, as the result of checking the destination of the reception packet by the routing accelerator RA(A), in the case where the destination is addressed to the communication port LC(d) under the routing accelerator RA(B), the information for the packet transmission is exchanged between the routing accelerator RA(A) and the routing accelerator RA(B), so that the packet is transmitted from the routing accelerator RA(A) to the routing accelerator RA(B).

A case 4(FIG. 3D) shows the case where the reception packet is a packet addressed to the router. The packet addressed to the router means the above-mentioned routing protocol frame (RIP or OSPF frame) or the frame data of the network management protocol SNMP. The routing accelerator RA(A) stores temporarily the packet, which has been received by the communication port LC(a) provided thereunder, in the packet buffer, and then performs the filtering and the routing. Then, for example, in the case where the destination IP address of the IP packet is an address of IP, the reception packet is transmitted to the router manager 2.

3. Configuration of Routing Accelerator

Next, the description will be given to a configuration of the routing accelerator 3.

Figure 4:
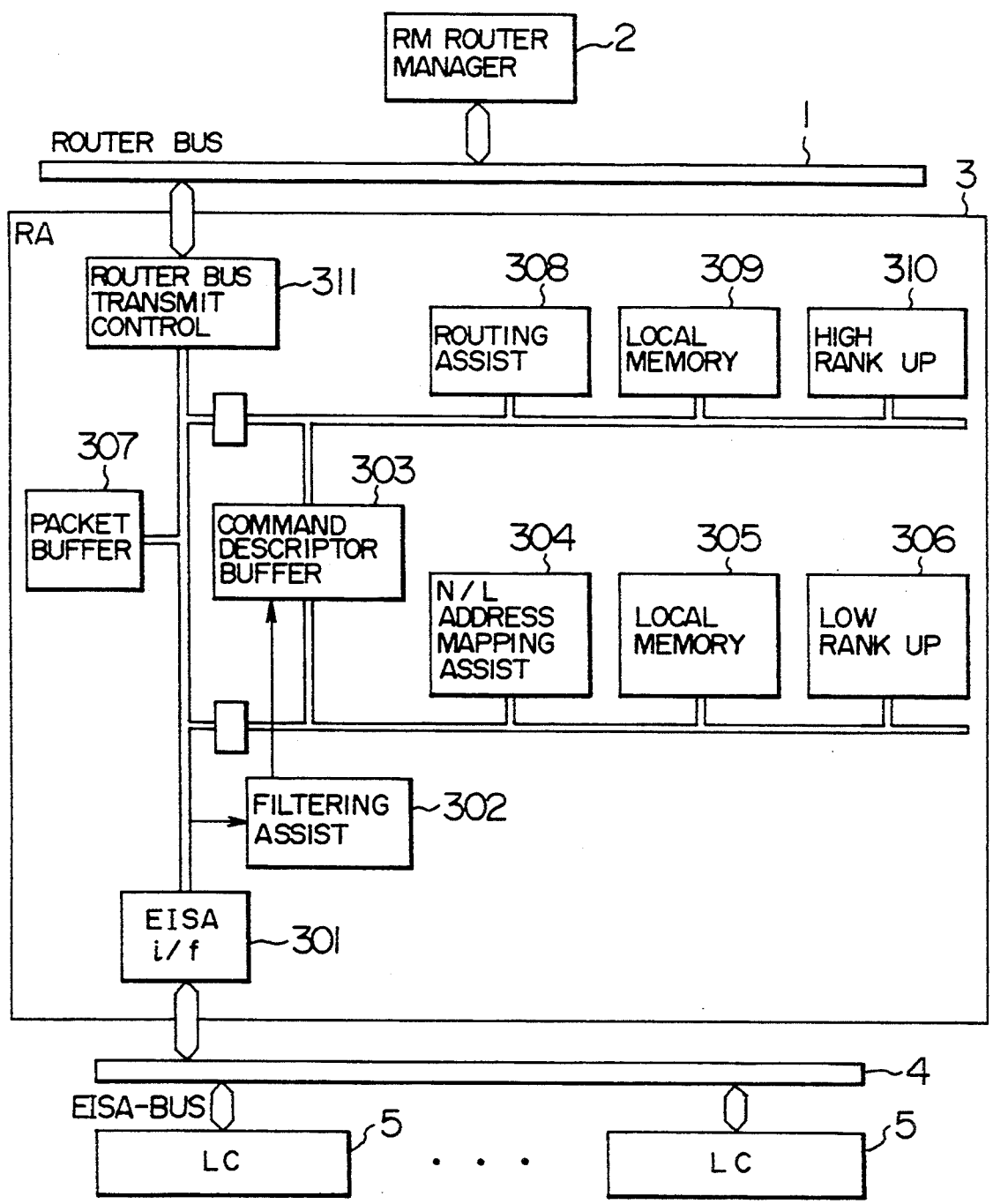
FIG. 4 is a block diagram showing a configuration of a routing accelerator according to one embodiment of the present invention.

FIG. 4 is a block diagram showing a configuration of the routing accelerator 3. The routing accelerator 3 is made up of a filtering assisting section 302 for filtering the reception packet with the hardware, a low rank processor 306 for taking mainly the filtering under its charge, a local memory 305 for the low rank processor 306, a routing assisting section 308 for routing the reception packet with the hardware, a high rank processor 310 for taking mainly the routing under its charge, a local memory 309 for the high rank processor 310, a command descriptor buffer 303 for exchanging the information between the filtering assisting section 302 and the low rank processor 306, or between the low rank processor 306 and the high rank processor 310, an address mapping assisting section 304 for mapping the network address (e.g., the IP address) on the physical address (e.g., the MAC address), an interface section 301 to the EISA bus 4, a packet buffer 307 and a router transmission control section 311.

Figure 16:
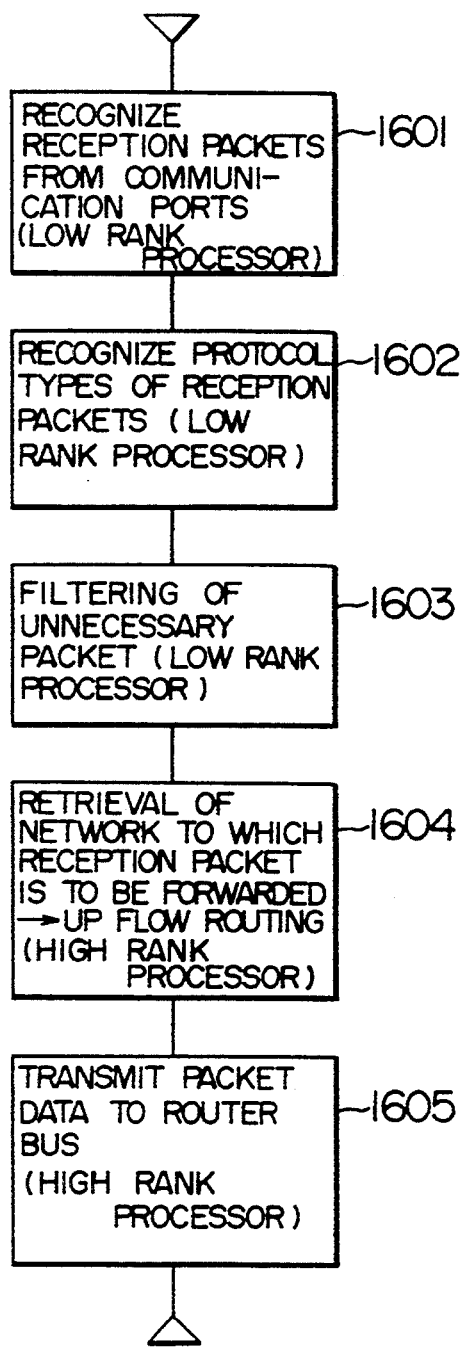
FIG. 16 is a flow chart showing the routing from a low rank to a high rank according to one embodiment of the present invention.

First, the description will be given to the routing along the data path from a low rank to a high rank through which the data is transmitted from a communication port 5 to a router bus 1 via the routing accelerator 3, on referring to FIG. 16.

All of the packets which have been received by the communication ports 5 are temporarily stored in the packet buffer 307 through the EISA bus interface section 301 by the DMA transmission which is performed by each communication port 5 (Step 1601). In parallel to the operation of transmitting the packets to the packet buffer 307, the filtering assisting section 302 extracts only the head portions of the packets which are required for the filtering to perform the comparison and the judgement under predetermined conditions, thereby to perform the filtering. As the processing for the filtering, in the present embodiment, the type of the protocol to be treated, e.g., either TCP/IP or OSI is recognized. In the case of the type of the protocol other than those protocols, the subsequent filtering/routing is not performed, but only the filtering as the bridging is performed (Step 1602). Incidentally, the types of the packets may be compared with the template as the address pattern corresponding to the application which was set by a user to perform the filtering.

The filtering assisting section 302 stores the comparison result in the command descriptor buffer 303 with the comparison result being corresponded to the pointer of the packet of interest for the packet buffer 307. The low rank processor 306 takes over this result to continue the subsequent filtering with the software. Then, if the packet is judged to be unnecessary, the packet of interest is discarded (Step 1603). Moreover, the low rank processor 306 performs the buffer management such as monitoring of the buffer empty state along the flow from the low rank to the high rank. Then, if the packet is not discarded, the routing instruction is stored in the command descriptor buffer 303 with being corresponded to the pointer for the packet buffer 307. Thus, the filtering is completed, and thereafter the routing will be performed in the following manner (Step 1604) to transmit the packet data to the router bus (Step 1605).

Figure 17:
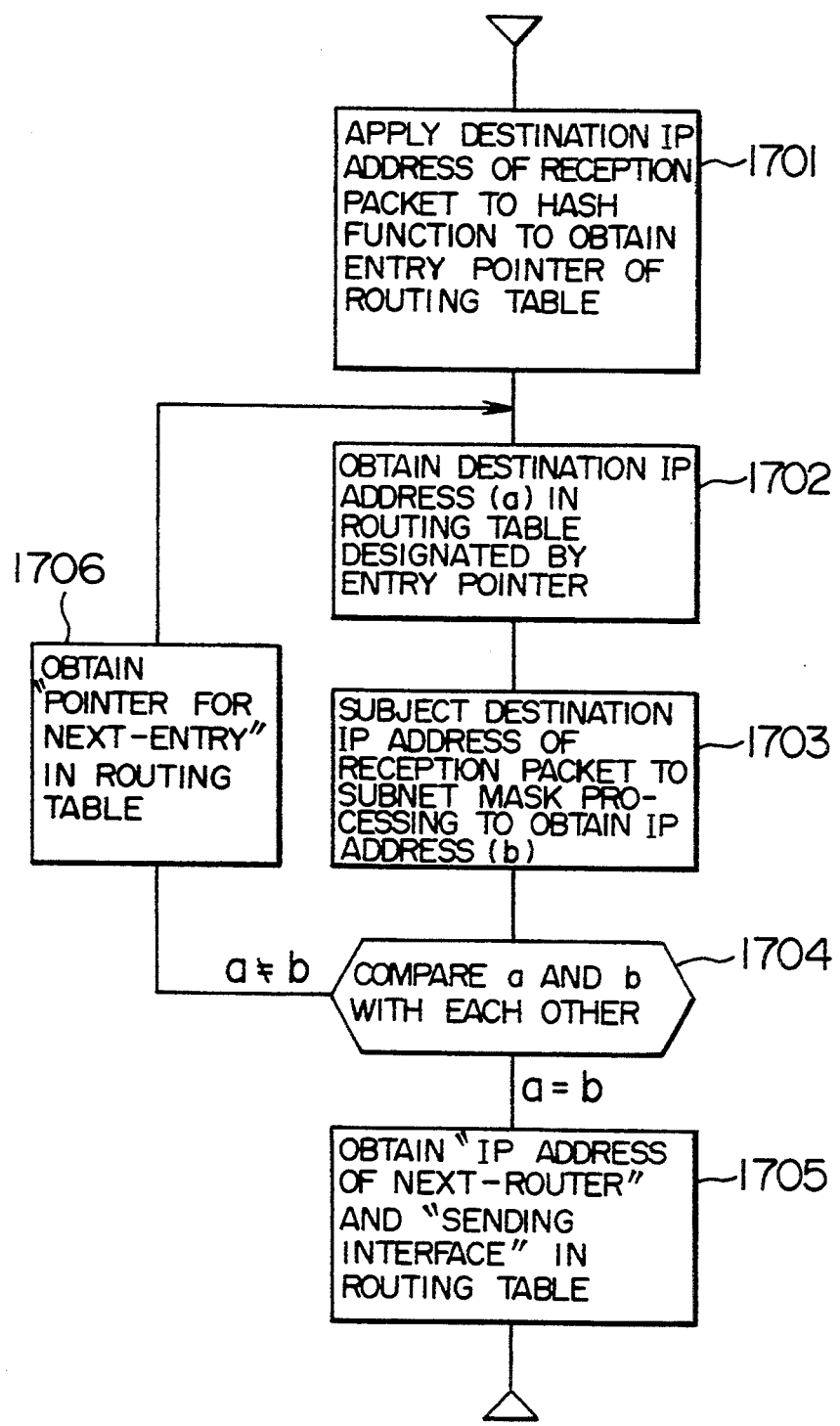
FIG. 17 is a flow chart showing an IP routing from a low rank to a high rank according to one embodiment of the present invention.

The description will hereinbelow be given to the IP routing along the up flow on referring to FIGS. 14, 15 and 17. FIG. 17 is a flow chart showing the IP routing of the high rank processor 310 along the up flow. First, the high rank processor 310 receives the routing instruction from the low rank processor 306 to read out the reception packet data on referring to the pointer for the packet buffer stored in the command descriptor buffer 303. Incidentally, in this case, it is assumed that the reception packet data is the IP packet. In FIG. 17, first, the destination IP address of the reception packet is read out, and the network portion of the IP address is applied to the hash function shown in FIG. 15 to obtain an entry pointer of the routing table (Step 1701). Next, the destination IP address (assuming to be a) in the routing information designated by that entry pointer is obtained (Step 1702). Since there is the possibility that the destination IP address (32 bits) of the reception packet employs the subnet, the network address value (assuming to be b), in which the host address portion (low rank n bits) is deleted using the subnet mask in the routing information, is obtained (Step 1703). Then, a and b are compared with each other (Step 1704). If a=b, the routing information is judged to be information for managing the destination of the reception packet, and the IP address 403 of the next-router and the sending interface 404 in the routing information (Step 1705). If a≠b, since the routing table is management information of another network address which becomes the same value through the hash processing, the pointer 405 for the next-entry in the routing information is read out (Step 1706). Then, the same processing is repeated with respect to the routing information designated by that pointer. Incidentally, the option processing is further required in some cases depending on the received IP packet.

After completion of the IP processing, the high rank processor 310 activates the router bus transmission control section 311 to transmit the data to the destination module, i.e., the routing assisting section 308 as the destination. As for the transmission operation, the calling router bus transmission control section 311 previously posts the command data such as the transmission request, the next-hop address, and the destination port number to the called router bus transmission control section 311, and then the called high rank processor 310 receives that command data. When the called high rank processor 310 completes the preparation for the reception of the transmission, that processor returns its answer to the calling router bus transmission control section 311, thereby to start the packet transmission.

Figure 18:
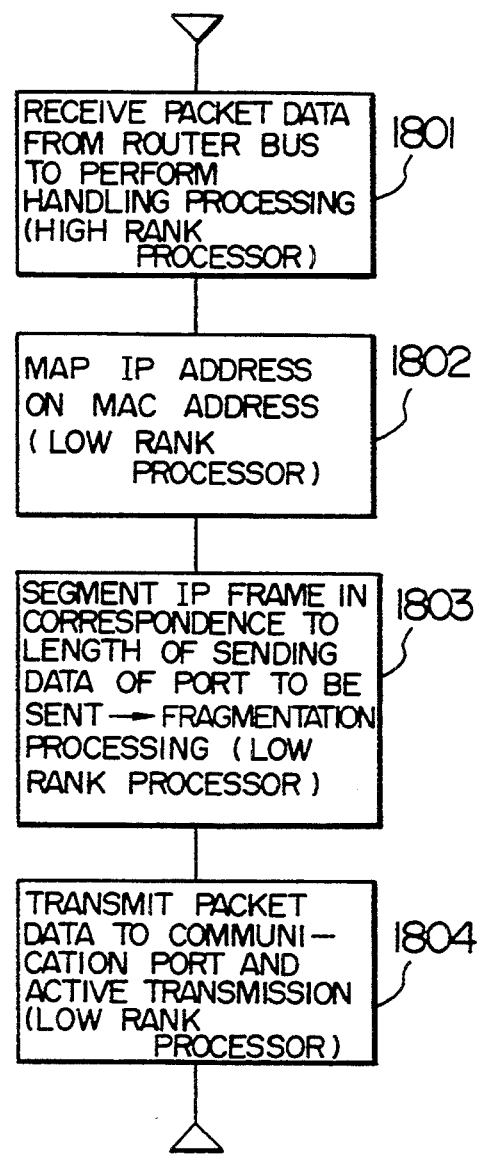
FIG. 18 is a flow chart showing the routing from a high rank to a low rank according to one embodiment of the present invention.

Hereinabove, the processing along the up flow by the calling routing accelerator 3 has been described. Next, the description will be given to the processing along the flow of the packet of the down flow (from the router bus to the communication port) by the called routing accelerator 3, on referring to FIG. 18.

When receiving the transmission request from the calling router bus transmission control section 311, the router bus transmission control section 311 posts that effect to the high rank processor 310. The buffer management along the down flow is performed by the high rank processor 310. The high rank processor 310 supplies the storage starting pointer for the packet buffer 307 to the router bus transmission control section 311. The router bus transmission control section 311 stores the packet from the router bus 1 in the packet buffer 307 while updating the buffer address with keeping the handshake to the calling router bus transmission control section 311. After storing the packet, the high rank processor 310 stores the storage completion information, the destination port number and the pointer for the buffer in the command descriptor buffer 203 (Step 1801).

In response to that information, the lower rank processor 306 performs the following processings. The low rank processor 306 inputs the next-hop address to the address mapping assisting section 304. On the other hand, the address mapping assisting section 304 maps the network address (IP address) on the physical address (MAC address) to post this effect to the low rank processor 306 (Step 1802). Incidentally, it is well known that the technique of mapping the IP address on the MAC address can be carried out on the basis of an ARP protocol (Address Resolution Protocol). Moreover, another technique may be taken in such a way that the mapping table used for mapping the IP address on the MAC address is previously prepared and the mapping processing is performed using this mapping table, or the learning type mapping table in which the result by the ARP protocol is registered is organized to perform the mapping processing.

Further, if the segmenting of the packet data for adjusting the packet length in correspondence to the destination communication port is required, the low rank processor 306 segments the packets in the packet buffer 307 (Step 1803).

Thereafter, the low rank processor 306 adds the physical address as the destination to the packet data (or plural packet data segmented) to form the packet data into the packet form of the corresponding port. Thus, when the preparation for the sending packet has been completed, the low rank processor 306 activates the communication port 5 provided thereunder to perform the sending to the network (Step 1804).

Moreover, the router of the present embodiment can support the multi-protocol. That is, in the above-mentioned filtering processing, either TCP/IP protocol or OSI protocol is discriminated from the reception packet header. On the basis of the discrimination result, either the IP routing or the OSI routing is continued. Moreover, in the case where the protocol cannot be discriminated, the packet is routed as the bridge. The bridging function will be described later.

Incidentally, in the present embodiment, the filtering is performed by the filtering assisting section 302 and the low rank processor 306, the routing is performed by the high rank processor 310 and the routing assisting section 308, and the address mapping is performed by the lower rank processor 306 and the address mapping assisting section 304. However, those processings may be also performed with the software by the microprocessor without the above-mentioned assisting means employing the hardware.

4. Scalability

Next, the description will be given to the scalability as the feature of the present invention. As has been described above, with the configuration of the router of the present invention, the small router can be constructed employing the module made up of the low speed line having the number of communication ports of 8 or less and one routing accelerator, and the module of the router manager. Then, if the communication ports and the routing accelerator are paired with each other to provide more modules, the routers from a medium scale to a large scale can be realized by the same architecture as that of the small router.

5. Separation between Packet Data Transmitting Bus and Control Data Transmitting Bus Next, the description will be given to another embodiment in which the system is operated at higher speed than that of the above-mentioned embodiment, on referring to FIG. 5. In the present embodiment, the above-mentioned router bus 1 is specially designed for the packet data transmission among the routing accelerators 8, and another bus as third connection means, i.e., a control system bus 5 is provided for the transmission of the control data such as the management frame and the forwarding information between the router manager 2 and the routing accelerators 8. As a result, even if other routing accelerators transmit the data to the router manager 2, a pair of routing accelerators which have the packet data to be subjected to the router forwarding can perform the packet data transmission using the router bus 1. Therefore, the router can be operated as the system at higher speed. Incidentally, for the purpose of connecting the control bus 5 to the routing accelerators 8, the bus interface of the router bus transmission control 311 shown in FIG. 4 can be realized by the 2-channel DMA control circuit corresponding to the router bus 1 and the control system bus 5.

Further, the description will be given to the scalability of the router system in the case where the third connection means is utilized, on referring to FIGS. 6 and 7. According to the present embodiment, by connecting the routing accelerators of the present invention to the prior art router through the bus, it is possible to improve the performance as the router and cope with the large scale network.

Figure 6:
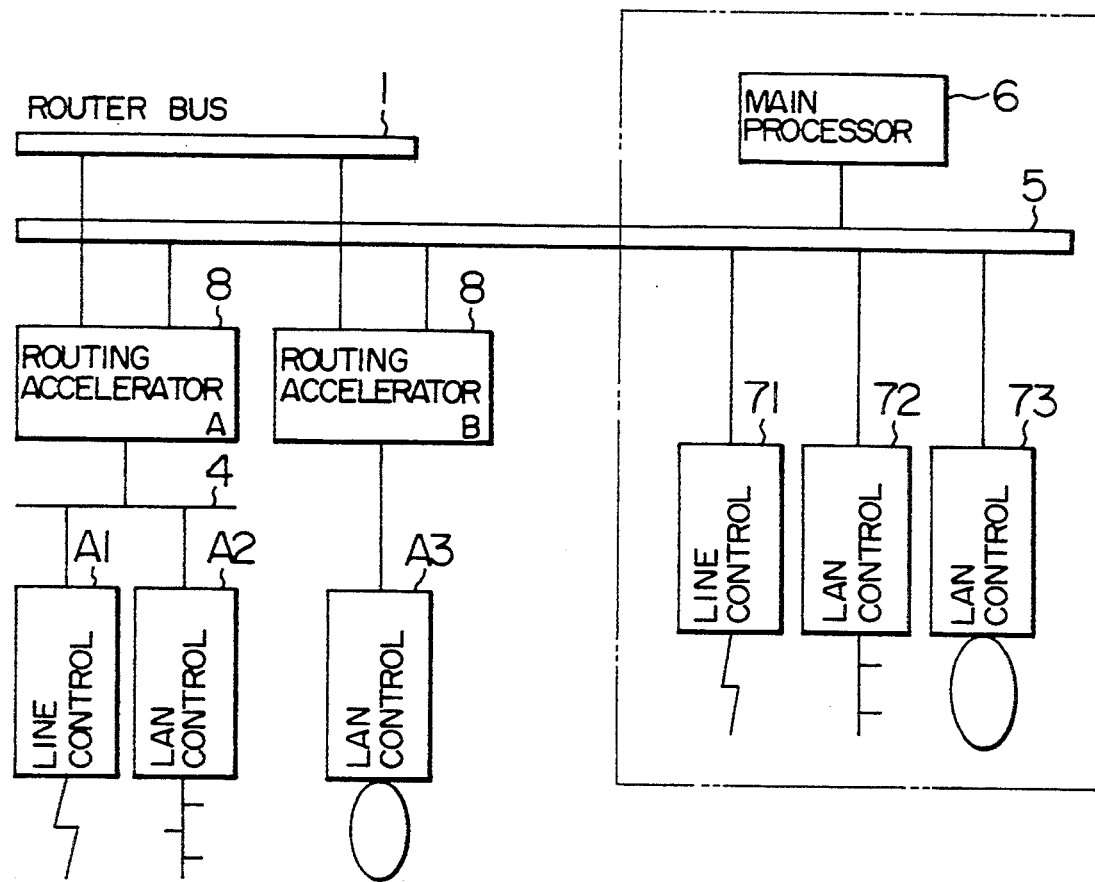
FIG. 6 is a block diagram showing a configuration of the internetworking apparatus in which a routing accelerator according to one embodiment of the present invention and the prior art router are coupled to each other.

FIG. 6 is a block diagram showing a configuration of one embodiment of the router which is realized by extending the prior art system. A portion surrounded by a dotted line of FIG. 6 corresponds to the elements of the prior art.

Figure 7:
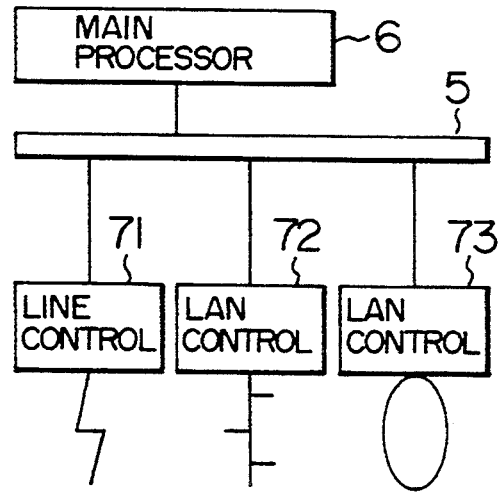
FIG. 7 is a block diagram showing a configuration of the prior art router.

FIG. 7 is a block diagram showing only the elements of the prior art router. In FIG. 7, the reference numeral 5 designates a bus which is generally used in the router or the small information processor. In this case, it is assumed that this bus is a VME bus. To the VME bus 5 are connected a main processor section 6 which is made up of a main memory, a microprocessor and the like, a line control section 71 as a communication port section, and LAN control sections 72 and 73. In this prior art router, normally, the routing is performed in the following manner.

For example, the main processor section 6 receives all of the packets which have been received by the LAN control section 72 to perform the selection of the destination port. Then, for example, if the destination port is the LAN control section 73, the packet data is transmitted to the LAN control section 73 through the VME bus 5 to perform the routing. Therefore, the VME bus 5 is used for exchanging both the packet data and the control information between the main processor section 6 and the communication control sections 71 to 73.

Now, returning to FIG. 6, the description of the embodiment of the present invention will be continued. Then, each routing accelerator 8 can be connected to a third bus in addition to the first and second buses. The VME bus which is employed in the prior art router is employed as the third bus, thereby to connect each routing accelerator to the main processor section 6. On the other hand, the high speed router bus 1 transmits only the packet data between the routing accelerators 8. That is, in the present embodiment, the main processor section 6 manages the whole router and carries out the function of distributing the routing table to the routing accelerators 8 for the router manager 2 of FIG. 5, whereby the prior art router can be extended to the router of the present invention which has the scalability as well as the high speed operation.

Moreover, the router is employed as the prior art system in the present embodiment. However, if the small information processor such as the work station other than the router exclusive machine, and the routing accelerators 8 are connected to each other, there is also provided the scalability inherent in the work station, such as the early disposal to a new protocol.

6. Function Scalability by Additional Provision of Auxiliary Processor

Figure 8:
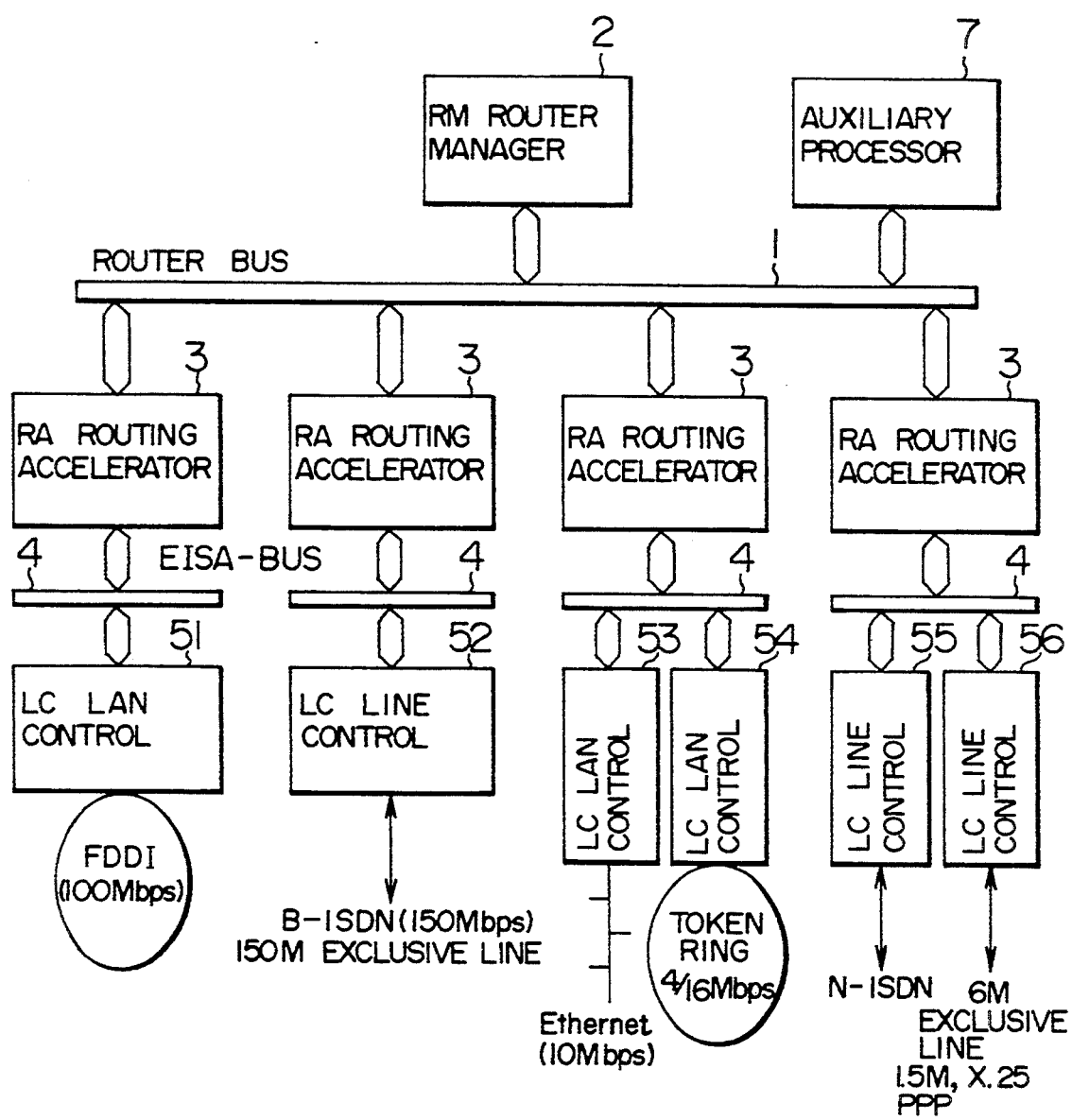
FIG. 8 is a block diagram showing a configuration of one embodiment of the present invention in which an auxiliary processor is provided.

Next, the description will be given to still another embodiment which is designed to further improve the function scalability of the router of the present invention, on referring to FIG. 8. In the block diagram of FIG. 8, as compared with the router of the block diagram of FIG. 1, an auxiliary processor 7 is further included. The auxiliary processor 7 may take partial charge of the processing of the router manager 2, i.e., the function of managing the whole system, or the processing of the routing protocol and the function of producing the routing table. However, in this case, the description will be given to an example in which an interface function for carrying out the connection to other information processors, i.e., the connection facility employing the above third bus is realized in order to improve the function scalability of the router.

In FIG. 9, with a router 100, an external interface board 101 for connecting an external connection bus (e.g., SCSI) 201 and a router bus 1 to each other is mounted as the auxiliary processor. The information processor 200 such as a work station has the SCSI bus 201 as the external connection bus. Now, it is assumed that the information processor 200 can process the protocol which can be processed by the router 100, such as a connection oriented conventional system host-terminal communication protocol. When receiving the packet data amenable to the conventional protocol from the line control port 56, the router 100 transmits the reception packet data from the routing accelerator 3 connected to the line control port 56 to the external interface board 101 through the router bus 1. Further, the external interface board 101 transmits the received packet data to the information processor 200 through the SCSI bus 201 to perform the forwarding of the received packet data.

Figure 10:
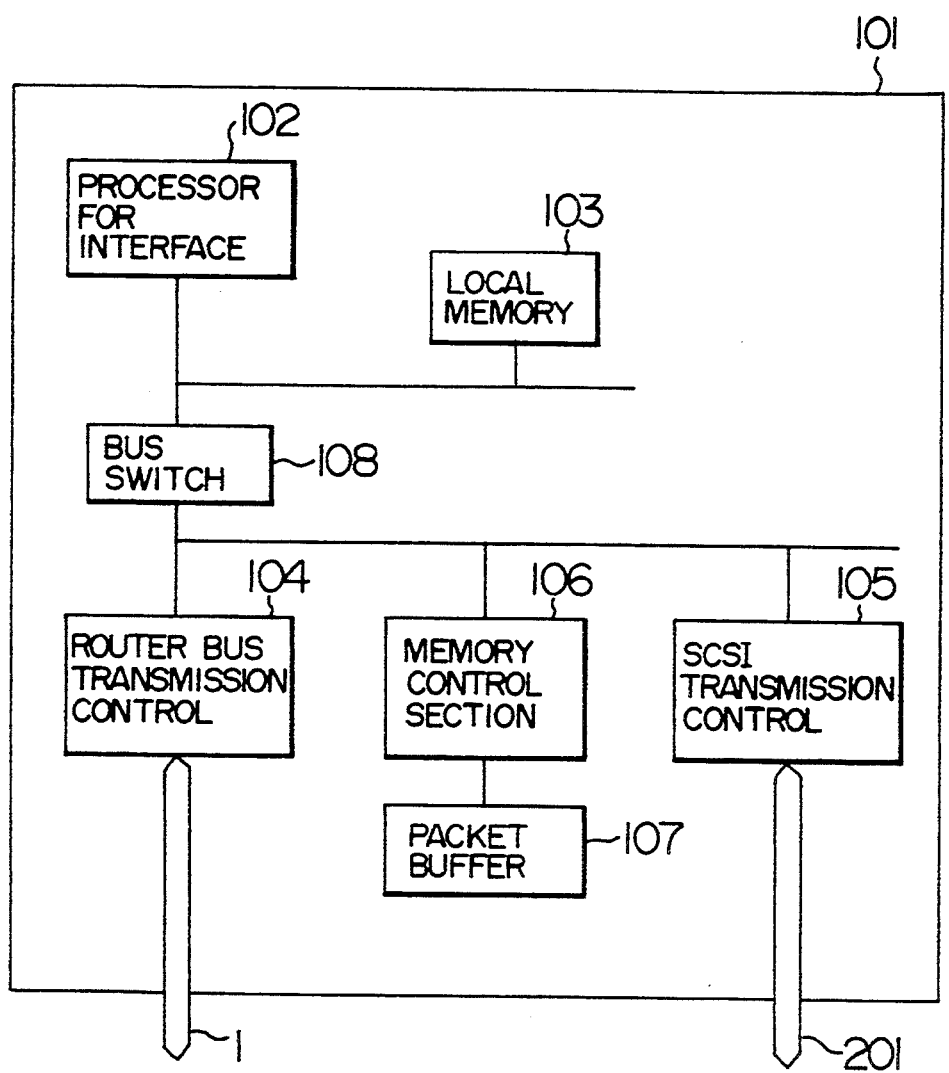
FIG. 10 is a block diagram showing a configuration of an external interface board according to one embodiment of the present invention.

FIG. 10 is a block diagram showing an example of a configuration of the external interface board 101. With the external interface board 101, the logical interface can be also realized between the routing accelerators 3 and the external information processor 200. For this purpose, a processor for interface 102 is provided, and a local memory 103 required for operating the processor 102 is provided. Further, the external interface board 101 has a router bus transmission control section 104, an SCSI bus transmission control section 105, a packet buffer 107 for storaging the packet data, and a control section 106 for controlling the packet buffer 107. Then, a bus switch 108 is provided so as to be able to perform simultaneously the external accesses to the processor 102 and the packet buffer 107. Therefore, the operation of the external interface board 101 is as follows. The router bus transmission control section 104 stores the packet data from the packet bus 1 in the packet buffer 107. The processor 102 adds the descriptor for being accessed thereto by the external information processor 200 to the packet data if necessary to post this effect to the external information processor 200. The external information processor 200 reads out the packet data from the packet buffer 107 through the SCSI bus transmission control section 105.

As described above, since the router includes the auxiliary processor having the interface function to the external side, it is possible to extend the function.

7. Mixture Processing of Routing and Bridging

Next, the description will hereinbelow be given to an embodiment about the bridging in the case where the routing cannot be performed in the internetworking apparatus according to the present invention.

In the case where the received packet data is amenable to the protocol which cannot be processed by the routing accelerator, as already described, if that routing accelerator is connected to another router or information processor, and the processing can be expected to be performed by those apparatuses, the processing can be performed by transmitting the received packet data from that routing accelerator to another router or information processor. Moreover, this is similarly applied to the case where the processing can be expected to be performed by the above-mentioned auxiliary processor or the main processor. However, since various communication protocols are present, there may naturally occur the case where the packet data of which routing cannot be performed by even the whole internetworking apparatus of the present invention is received. In this case, the bridging, in which only the conversion at data link levels is performed to perform the forwarding for all of the possible networks, is carried out. That is, the routing accelerator performs the multiple transmission to other routing accelerators, thereby to perform the bridging. However, in the present internetworking apparatus, the routing and the bridging may naturally occur with being mixed with each other. In this case, the multiple transmission to the router bus takes much time, and thus the forwarding performance as the system is sometimes reduced. This will be described on referring to FIG. 11.

Figure 11:
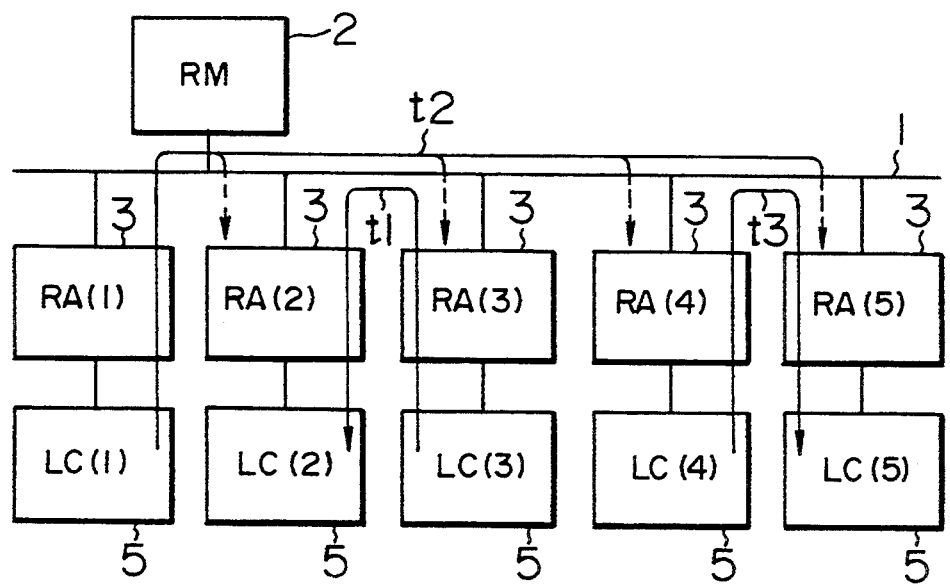
FIG. 11 is a block diagram showing a case of the bridging when no bridging assisting section is provided in one embodiment of the present invention.

In the internetworking apparatus shown in FIG. 11, it is assumed that a routing accelerator RA(2) subjects the reception packet from a communication port LC(2) provided thereunder to the routing, and as a result, it starts transmitting the packet data to a routing accelerator RA(3) through a router bus in order to perform the routing to a communication port LC(3) of another routing accelerator RA(3) (corresponding to the data transmission route represented by t1 of FIG. 11).

On the other hand, a routing accelerator RA(1) intends to subject the reception packet data from a communication port LC(1) provided thereunder to the routing, and as a result, it is judged that the packet data cannot be subjected to the routing by the routing accelerator RA(1). Then, the routing accelerator RA(1) intends to transmit the packet data through the multiple transmission in order to perform the bridging to all of the other routing accelerators. However, since at this time, the data is being transmitted from the routing accelerator RA(2) to the routing accelerator RA(3), the routing accelerator RA(1) cannot perform the data transmission through the multiple transmission. Therefore, the routing accelerator RA(1) will wait until the routing accelerator RA(3) can prepare for receiving the data from the router bus (corresponding to the uncompleted data transmission indicated by t2 of FIG. 11).

Further, if before the data transmission from the routing accelerator RA(2) to the routing accelerator RA(3) has been completed, the data transmission for the routing from the routing accelerator RA(4) to the routing accelerator RA(5) occurs (corresponding to the data transmission indicated by t3 of FIG. 11), the routing accelerator RA(1) will wait until the routing accelerator RA(5) can prepare for receiving the data from the router bus.

More specifically, the routing accelerator, which intends to perform the multiple transmission to all of the other routing accelerators in order to perform the bridging, waits for the completion of the data transmission between the other routing accelerators. Therefore, that routing accelerator must continue to store the reception data, which can be routed, from the communication port provided thereunder. As a result, the routing performance of the internetworking apparatus connected to the network, which generates a relatively large number of bridgings, is reduced.

In order to solve such problems, in the present invention, the above-mentioned auxiliary processor is used as the assisting facility of the bridging. The present embodiment will be described with reference to FIGS. 12 and 13.

Figure 12:
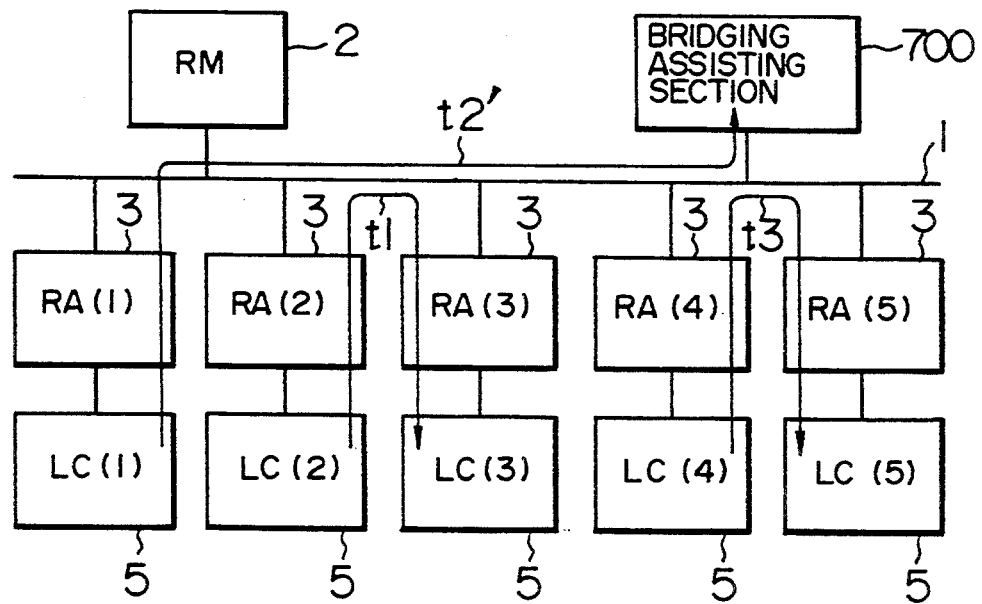
FIG. 12 is a block diagram showing a case of the bridging when a bridging assisting section is provided in one embodiment of the present invention.

In the internetworking apparatus shown in FIG. 12 as well, it is assumed that the data transmission from the routing accelerator RA(2) to the routing accelerator RA(3) occurs (corresponding to the data transmission indicated by t1 of FIG. 12). Then, in the same manner as in FIG. 11, the routing accelerator RA(1) judges that the reception packet data from the communication port provided thereunder should be subjected to the bridging. At this time, the routing accelerator RA(1) does not perform the multiple transmission to all of the other routing accelerator, but transmits the packet data to the bridging assisting section 700 (corresponding to the data transmission indicated by t2üL of FIG. 12). Thereafter, the bridging assisting section 700 intends to perform the multiple transmission to all of the routing accelerators. Then, similarly, even if the data transmission from the routing accelerator RA(4) to the routing accelerator RA(5) occurs (corresponding to the data transmission indicated by t3 of FIG. 12), the bridging assisting section 700 only waits for the multiple transmission. Therefore, the routing accelerator RA(1) does not need to continue to store the subsequent reception data which can be routed. Accordingly, the reduction of the routing performance can be prevented.

Next, the description will be given to a configuration of the bridging assisting section 700 with reference to FIG. 13. A bridging assisting section 700 is made up of a buffer managing processor 701 for managing mainly the buffer, a local memory 702 for storing a program and variables of the processor 701, a packet buffer 703 for storing temporarily the data to be subjected to the bridging, a router bus transmission control circuit 704, and a bus switching circuit 705 which controls the isolation of the bus for performing simultaneously both the transmission of the data from the router bus and the access of the processor 701 to the local memory 702. As described above, the packet data, which is intended to be subjected to the bridging through the routing accelerator, is stored in the packet buffer 703 through the router bus transmission control circuit 704. At this time, the packet buffer 703 is subjected to the queuing management by the buffer managing processor 701, and thus the buffer managing processor 701 performs the multiple transmission of the packet data to all of the routing accelerators in the order of storage of the packet data in the packet buffer 703.

As set forth hereinabove, according to the present invention, since the bridging is assisted by the auxiliary processor, it is possible to improve the router processing performance in the brouter.

We claim:

1. An internetworking apparatus for connecting a plurality of networks to one another to forward packet data, comprising:
   a main processor including means for managing said internetworking apparatus;
   a plurality of routing accelerators connected to one another through a first connection bus, said routing accelerators mutually performing a forward routing of reception packet data received from one of said networks to a called network determined based on address information of the reception packet data and a routing table stored therein, through said first connection bus; and
   a plurality of communication port sections, connected to said routing accelerators through a second connection bus, provided independently to every routing accelerator, said communication port sections controlling the network connected thereto to exchange packet data;
   wherein said main processor is also connected to said first connection bus, and said main processor controls said routing accelerators through said first connection bus;
   wherein said main processor and said routing accelerators are connected to one another through a third connection bus, and said third connection bus transmits control information including the routing table, and said first connection means transmits the packet data.

2. An internetworking apparatus according to claim 1, further comprising another information processor connected to said third connection means for carrying out a partial function of said main processor.

3. An internetworking apparatus according to claim 1, further comprising another internetworking apparatus connected to said third connection bus, wherein the forwarding of the packet data between the communication ports in said internetworking apparatus and the communication ports in said another internetworking apparatus is performed through said third connection bus.

4. An internetworking apparatus for connecting a plurality of networks to one another to forward packet data, comprising:
- a main processor including means for managing said internetworking apparatus by receiving routing information to prepare a routing table and by distributing the routing table;
- a plurality of routing accelerators connected to said main processor and connected to one another through a first connection bus, said routing accelerators mutually performing a forward routing of reception packet data to a called network determined by address information of the reception packet data and the routing table stored therein, through said first connection means, said routing accelerators forwarding the routing information to said main processor through said first communication bus;
- a plurality of communication port sections connected to said routing accelerators through a second connection bus provided independently to every routing accelerator, said communication port sections controlling the network connected thereto to receive packet data, said routing accelerators forwarding the routing information to said main processor through said first communication bus; and
- one or more auxiliary processors, connected to said first connection bus so that said auxiliary processors are connected to said main processor and said plurality of routing accelerators, said auxiliary processors carrying out auxiliary operations not performed by said main processor.

5. An internetworking apparatus according to claim 4, wherein the auxiliary processor carries out a protocol function of said main processor.

6. An internetworking apparatus for connecting a plurality of networks to one another to forward packet data, comprising:
- a main processor including means for managing said. internetworking apparatus;
- a plurality of routing accelerators connected to said main processor and connected to one another through a first connection bus, said routing accelerators mutually performing a forward routing of reception packet data received from one of said networks to a called network determined by address information of the reception packet data and a routing table stored therein, through said first connection bus;
- a plurality of communication port sections connected to said routing accelerators through a second connection bus provided independently to every routing accelerator, said communication port sections controlling the networks connected thereto to exchange packet data; and
- one or more auxiliary processors, connected to said plurality of routing accelerators through said fist connection bus, for carrying out auxiliary operations not performed by said main processor;
- wherein the auxiliary processor includes means for processing the protocol which cannot be subjected to the forward routing by the routing accelerator, and the routing accelerator discriminates what kind of packet data the reception packet data from the communication port section is, and in the case where the reception packet data is recognized to be a kind of packet data which cannot be subjected to routing, the reception packet data is transmitted to the auxiliary processor.

7. An internetworking apparatus for connecting a plurality of networks to one another to forward packet data, comprising:
- a main processor including means for managing said internetworking apparatus;
- a plurality of routing accelerators connected to said main processor and connected to one another through a first connection bus, said routing accelerators mutually performing a forward routing of reception packet data received from one of said networks to a called network determined by address information of the reception packet data and a routing table stored therein, through said first connection bus;
- a plurality of communication port sections connected to said routing accelerators through a second connection bus provided independently to every routing accelerator, said communication port sections controlling the networks connected thereto to exchange packet data; and
- one or more auxiliary processors, connected to said plurality of routing accelerators through said fist connection bus, for carrying out auxiliary operations not performed by said main processor;
- wherein the auxiliary processor includes an interface circuit connected to another information processor or internetworking apparatus, and the routing accelerator utilizes the function of said another information processor or internetworking apparatus through the auxiliary processor.

8. An internetworking apparatus for connecting a plurality of networks to one another to forward packet data, comprising:
- a main processor including means for managing said internetworking apparatus;
- a plurality of routing accelerators connected to said main processor and connected to one another through a first connection bus, said routing accelerators mutually performing a forward routing of reception packet data received from one of said networks to a called network determined by address information of the reception packet data and a routing table stored therein, through said first connection bus;
- a plurality of communication port sections connected to said routing accelerators through a second connection bus provided independently to every routing accelerator, said communication port sections controlling the networks connected thereto to exchange packet data; and
- one or more auxiliary processors, connected to said plurality of routing accelerators through said fist connection bus, for carrying out auxiliary operations not performed by said main processor;

wherein the auxiliary processor includes means for multiple-transmitting the data to all or a part of said plurality of routing accelerators, and each routing accelerator discriminates what kind of packet data the reception packet data from the communication port section is, and in the case where the reception packet data is recognized to be a kind of packet data which cannot be subjected to routing, the reception packet data is transmitted to the auxiliary processor, and the auxiliary processor multiple-transmits the reception packet data to other routing accelerators to perform the bridging to another network.

9. An internetworking apparatus for connecting a plurality of networks to one another to forward packet data, comprising:

a main processor including means for managing said internetworking apparatus;

a plurality of routing accelerators connected to said main processor and connected to one another through first connection bus, said routing accelerators mutually performing a forward routing of reception packet data received from one of the networks through said first connection bus to a called network determined based on address information of the reception packet data and a routing table stored in the routing accelerators, said routing table being used by said routing accelerators to perform forward routing of packet data; and a plurality of communication port sections connected to said routing accelerators through a second connection bus provided independently to every routing accelerator, said communication port sections controlling the network connected thereto to exchange packet data;

wherein said main processor further includes means for dynamically producing said routing table required for said routing accelerators to perform the forward routing of said reception packet data, said routing table being produced by exchanging said routing table with another internetworking apparatus, and means for distributing said routing table to said plurality of routing accelerators, and wherein said routing accelerators store said routing table.

10. An internetworking apparatus according to claim 9, wherein said main processor is also connected to said first connection means, and said main processor controls said routing accelerators through said first connection means.

11. An internetworking apparatus according to claim 9, wherein the routing accelerator includes a buffer for storing the packet data, and filtering assisting means for extracting, in parallel to the storage operation of said buffer, necessary information from the packet data to perform the filtering of the packet data under predetermined conditions.

12. An internetworking apparatus according to claim 9, wherein the routing accelerator includes a buffer for storing the packet data, and routing assisting means for extracting necessary information from reception packet data to retrieve a predetermined routing table.

13. An internetworking apparatus according to claim 9, wherein said routing accelerators each discriminates what kind of packet data the reception packet data from a communication port section is and recognizes that the reception packet data is packet data which cannot be subjected to routing when it is found as a result of the discrimination that the reception packet data is not a kind of packet data which is supported by said routing accelerator, and in the case where it is recognized that the reception packet data is a kind of packet data which cannot be subjected to routing, the reception packet data is transmitted to all of the other routing accelerators to perform bridging to another network.

14. An internetworking apparatus according to claim 13, wherein in the case where the routing accelerator recognizes the packet data which cannot be subjected to the routing, the reception packet data is also transmitted to the communication port section or sections other than the communication port section which has received the reception packet data, out of said communication port sections connected to said routing accelerators.

15. An internetworking apparatus according to claim 9, wherein the routing accelerator registers for each communication port physical station address data of a communication system connected to a communication port corresponding to each communication port section, and includes for said each communication port, filtering means for discarding the reception packet data of which address coincides with that of the station address data registered.

16. An internetworking apparatus according to claim 9, wherein said main processor further includes means for processing the protocol which cannot be subjected to the forward routing by the routing accelerator, and the routing accelerator discriminates what kind of packet data the reception packet data from the communication port section is, and in the case where the reception packet data is recognized to be a kind of packet data which cannot be subjected to routing, the packet data is transmitted to said main processor.

* * * * *